United States Patent
Baek et al.

(10) Patent No.: US 7,804,905 B2
(45) Date of Patent: Sep. 28, 2010

(54) FAST FOURIER TRANSFORM PROCESSORS, METHODS AND ORTHOGONAL FREQUENCY DIVISION MULTIPLEXING RECEIVERS INCLUDING MEMORY BANKS

(75) Inventors: Seung-Kwon Baek, Gyeonggi-do (KR); Hoon-Soon Choi, Seoul (KR); Ju-Yon Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 2029 days.

(21) Appl. No.: 10/719,192

(22) Filed: Nov. 21, 2003

(65) Prior Publication Data
US 2004/0105506 A1    Jun. 3, 2004

(30) Foreign Application Priority Data
Nov. 25, 2002   (KR) .................. 10-2002-0073659

(51) Int. Cl.
*H04L 27/28* (2006.01)
(52) U.S. Cl. .................. 375/260; 375/229; 375/316; 375/354; 370/310; 370/324; 370/395.62; 370/503; 708/404
(58) Field of Classification Search .......... 375/260, 375/340, 355, 354, 229, 316; 708/404; 370/310, 370/324, 395.62, 503
See application file for complete search history.

(56) References Cited

U.S. PATENT DOCUMENTS

| | | | | |
|---|---|---|---|---|
| 3,988,601 A | * | 10/1976 | Perry | 377/55 |
| 5,550,812 A | * | 8/1996 | Philips | 370/203 |
| 5,732,113 A | * | 3/1998 | Schmidl et al. | 375/355 |
| 5,778,073 A | * | 7/1998 | Busching et al. | 380/33 |
| 6,098,088 A | * | 8/2000 | He et al. | 708/406 |
| 6,195,534 B1 | * | 2/2001 | Sakoda et al. | 455/45 |
| 7,065,036 B1 | * | 6/2006 | Ryan | 370/208 |

(Continued)

FOREIGN PATENT DOCUMENTS

EP        0 478 128 A2     4/1992

(Continued)

OTHER PUBLICATIONS

Japanese Office Action (2 pages) corresponding to Japanese Patent Application No. 2003-394450; Mailing Date: Apr. 8, 2009.

*Primary Examiner*—Mohammad H Ghayour
*Assistant Examiner*—Leila Malek
(74) *Attorney, Agent, or Firm*—Myers Bigel Sibley & Sajovec (57) ABSTRACT

A signal converter having a memory bank and radix-2 Fast Fourier Transform (FFT) transforms an Orthogonal Frequency Division Multiplexing (OFDM) signal having a long preamble and data into an OFDM signal in the frequency domain, and outputs the transformed OFDM signal. The radix-2 FFT has a linear systolic array architecture, transforms the long preamble stored in the memory bank by FFT, then stores the transformed long preamble into the memory bank, transforms data input through a buffering process and data input directly by FFT, and stores the transformed data in the memory bank. The memory bank has four memories, stores the long preamble transformed or not transformed and outputs the stored long preambles or the transformed data for the purpose of demodulation as the transformed data is input. Data-processing delay and/or power consumption may be reduced during the operation of the FFT processor.

5 Claims, 10 Drawing Sheets

U.S. PATENT DOCUMENTS

| | | | |
|---|---|---|---|
| 7,161,896 B1 * | 1/2007 | Hart et al. | 370/206 |
| 2003/0050945 A1 * | 3/2003 | Chen et al. | 708/404 |
| 2003/0076904 A1 * | 4/2003 | Magee | 375/340 |
| 2004/0146117 A1 * | 7/2004 | Subramaniam et al. | 375/260 |

FOREIGN PATENT DOCUMENTS

| | | |
|---|---|---|
| JP | 2001-022731 A | 1/2001 |
| JP | 2001-136149 A | 5/2001 |
| WO | WO 02/48901 A2 | 6/2002 |

* cited by examiner

FAST FOURIER TRANSFORM PROCESSORS, METHODS AND ORTHOGONAL FREQUENCY DIVISION MULTIPLEXING RECEIVERS INCLUDING MEMORY BANKS

RELATED APPLICATION

This application claims the benefit of Korean Patent Application No. 2002-0073659, filed Nov. 25, 2002, the disclosure of which is hereby incorporated herein by reference in its entirety as if set forth fully herein.

FIELD OF THE INVENTION

The present invention relates to fast Fourier transform processors and methods, and more particularly to fast Fourier transform processors and methods that may be used in orthogonal frequency division multiplexing receivers.

BACKGROUND OF THE INVENTION

Orthogonal Frequency Division Multiplexing (OFDM) transmitting and receiving systems and methods are well known for voice and/or data communication. In general, OFDM is a spread spectrum technique that distributes data over a large number of carriers that may be spaced apart at various frequencies. More specifically, OFDM converts data input in series along the time axis into data in parallel, performs an Inverse Fast Fourier Transform (IFFT) with respect to the data in parallel, then converts the inverse-transformed data in parallel into data in series, and transmits the data in series to an OFDM receiver. The OFDM receiver converts the input signal into a digital signal. In this case, the digital signal is transformed by a Fast Fourier Transform (FFT) so that the digital signal is restored to an original signal.

In the IEEE 802.11a specification, a signal is transmitted and received using OFDM. IEEE 802.11a provides a standard for wireless modems. An OFDM transmitting system transmits a short preamble and a long preamble in the first half of a packet for the purpose of synchronization of a signal. An OFDM receiving system synchronizes a signal with the preamble to demodulate an OFDM signal.

Figure 1:
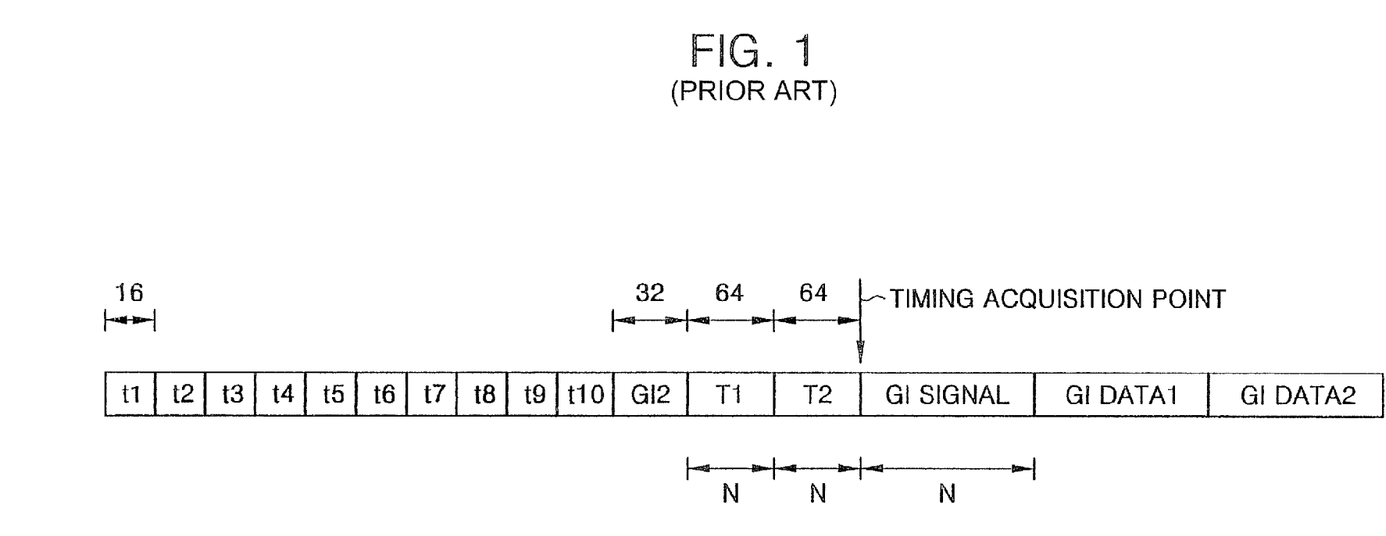
FIG. 1 is a view illustrating a packet of a general OFDM signal.

FIG. 1 is a view illustrating a packet of a general OFDM signal, and more particularly shows a packet of an OFDM signal according to IEEE 802.11a.

Referring to FIG. 1, the packet of the OFDM signal has two preambles. A period of the short preamble has 16-samples and a period of the long preamble has 64-samples. Sections t1-t10 of the packet correspond to the short preamble. Sections T1 and T2 of the packet correspond to the long preamble. The length of one sample of a preamble is 50 ns, and the whole length of the preamble is 16 μs.

In IEEE 802.11a, t1-t7 sections of the packet are assigned for the purpose of signal detection, Automatic Gain Control (AGC) and diversity selection, and three sections t8, t9, and t10 of the packet are assigned for coarse carrier frequency offset and symbol synchronization offset assumption. Two sections T1 and T2 are assigned for fine carrier frequency offset and channel assumption.

GI2 is an N/2-sample guard interval, and GI is an N/4-sample guard interval. N is the number of FFT points, and a symbol equals to the FFT point plus a variable interval. For example, when the FFT point is 64, N is 64, and the symbol having the variable interval can be 80.

As described above, the OFDM receiver uses a long preamble, and both time domain and frequency domain of the FFT may use the long preamble simultaneously. Therefore, when it is a long preamble, the OFDM receiver may perform a signal buffering so that the signal is delayed.

SUMMARY OF THE INVENTION

According to some embodiments of the present invention, there is provided a fast Fourier transform processor for demodulating an orthogonal frequency division multiplexing signal having a symbol, wherein the symbol includes a first long preamble and first data. In the processor, a timing acquisition section is configured to output a timing signal in response to detecting an end point of the first long preamble and a controller is configured to output a first control signal and a second control signal in response to the timing signal. A signal converter is configured to store the first long preamble in response to the first control signal, to transform the first long preamble by a fast Fourier transform into a second long preamble, to store the second long preamble, to transform sequentially the first data by the fast Fourier transform into second data as the first data sequentially is received, to output the second long preamble, to store the second data, and to output the second data. A frequency domain equalizer is configured to synchronize the second long preamble and the second data that is output from the signal converter in response to the second control signal with a clock frequency of the fast Fourier transform processor, and to output the synchronized second long preamble and second data.

According to other embodiments of the present invention, there are provided methods of transforming an Orthogonal Frequency Division Multiplexing (OFDM) signal by a fast Fourier transform, wherein the OFDM signal has a symbol that includes a first long preamble, a second long preamble and first data, and the first and second long preambles respectively have a sequence of N-samples. In these fast Fourier transform methods, the first long preamble and the second long preamble are stored in first, second, third and fourth memories in sequence as the OFDM signal is received. After reading the first long preamble and the second long preamble stored in the first, second, third and fourth memories responsive to an end point of the second long preamble being detected, the first and second long preambles are transformed by a fast Fourier transform, respectively, into a third preamble and a fourth preamble, and the third and fourth long preambles are stored in sequence in the first memory and the second memory. The second data that is input after the first data is buffered, and the first data that is directly input, respectively, are transformed into third data when the first and second long preambles are transformed into the third and fourth data, and the third data is stored in the memories in sequence, and then the third data stored in the memories is output. It is determined whether or not the symbol is a final symbol, and the fast Fourier transform method is finished when the symbol is the final symbol, and the buffering process of the second data and the following steps are repeated when the symbol is not the final symbol.

According to still other embodiments of the present invention, there is provided an OFDM receiver. A quadrature detector is configured to receive an OFDM signal having a symbol. The symbol has a first long preamble and first data. The quadrature detector is configured to convert the OFDM signal into a baseband OFDM signal to generate a real component of the OFDM signal and an imaginary component of the OFDM signal, and to output the real component of the OFDM signal and the imaginary component of the OFDM signal. An A/D converter is configured to convert the real and imaginary components of the OFDM signal, respectively, into digital real and imaginary components of a digital OFDM signal, and to output the digital real and imaginary components of the digital OFDM signal. A fast Fourier transform processor transforms the digital OFDM signal by a fast Fourier transform. A demodulator receives the transformed real and imaginary components of the transformed OFDM signal to demodulate the transformed real and imaginary components of the transformed OFDM signal. The fast Fourier transform processor may be provided as was described above.

Fast Fourier Transform (FFT) processors for processing an OFDM signal having a symbol including a first long preamble and first data, according to other embodiments of the present invention, include an input buffer that is configured to temporarily store the first data and a memory bank that is configured to store the first long preamble. An FFT unit is configured to transform the first long preamble in the memory bank into a second long preamble in a frequency domain, and to store the second long preamble back into the memory bank, to transform the first data that is temporarily stored in the input buffer into second data in the frequency domain, and to store the second data into the memory bank. Analogous methods also may be provided.

According to embodiments of the present invention, the frequency converter includes a radix-2 FFT that has pipelined structure that is configured to transform the long preamble stored in the memory bank by FFT, to store the transformed long preamble in the memory bank, to transform the data that is input through the FFT input buffer and the data that is input directly to the radix-2 FFT by FFT, and then to store the transformed data in the memory bank. In embodiments, the memory bank has four memories, and each of the memories stores the long preamble that is not transformed and the transformed long preamble. The memory bank is configured to output the transformed long preamble that is stored in the memory bank or the transformed data for the purpose of demodulation as the transformed data is input into the memory bank. OFDM receivers according to embodiments of the present invention use memories in parallel so that the memories may be used effectively, operation clock of the FFT may be reduced and/or processing delay of an OFDM signal may be reduced. In embodiments, the OFDM receivers use a single port memory and reuse the memory so that a hardware structure may be simplified. In addition, embodiments of the OFDM receivers have a linear systolic array architecture FFT so that operating power may be reduced.

DETAILED DESCRIPTION

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 2:
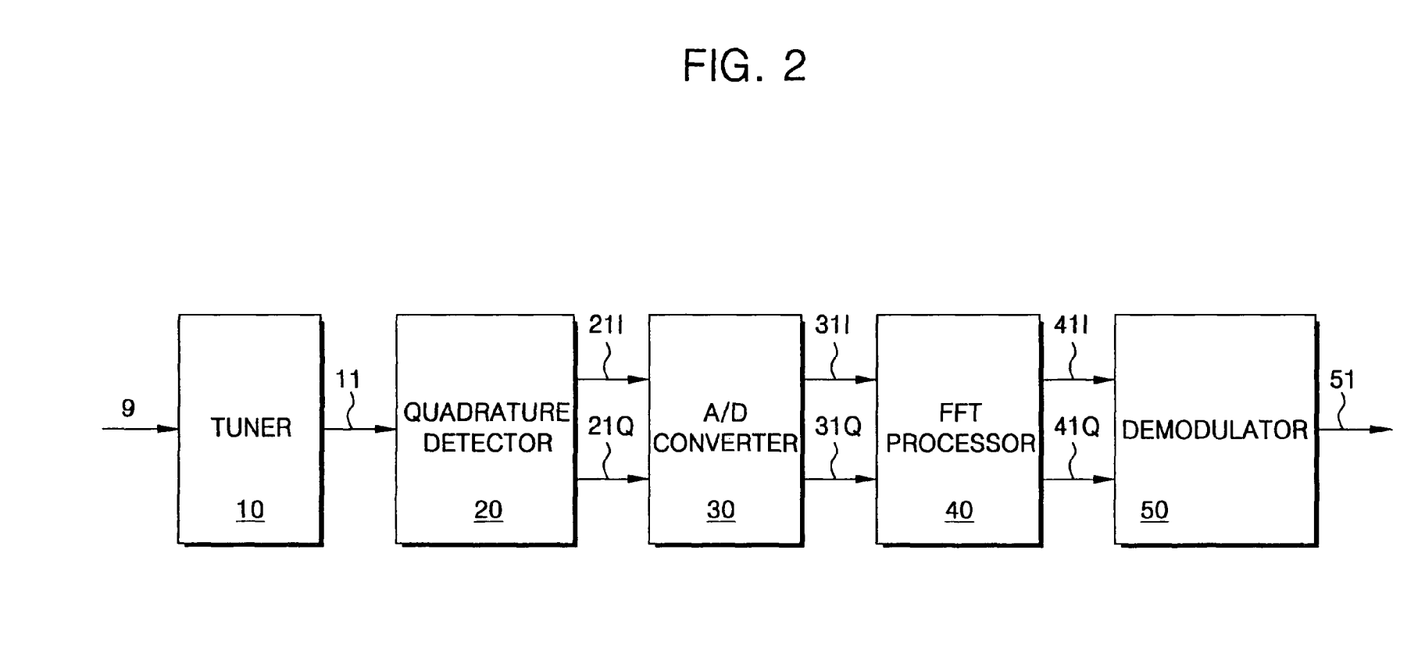
FIG. 2 is a block diagram illustrating an OFDM receiver according to embodiments of the present invention.

FIG. 2 is a block diagram illustrating an OFDM receiver according to embodiments of the present invention.

Referring to FIG. 2, OFDM receivers according to embodiments of the present invention includes a tuner 10, a quadrature detector 20, an Analog-to-Digital (A/D) converter 30, an FFT processor 40 and a demodulator 50. The OFDM receiver receives an OFDM signal, demodulates the OFDM signal, and provides the demodulated OFDM signal to playback equipment (not shown) and/or other devices.

The tuner 10 is coupled to a receiving unit (not shown), receives the OFDM signal 9 transmitted from an OFDM transmitting device (not shown) through the receiving unit, converts the received OFDM signal 9 into an OFDM signal 11 having a range of an intermediate frequency, and provides the OFDM signal 11 to the quadrature detector 20.

The quadrature detector 20 converts the OFDM signal 11 provided from the tuner 10 into a baseband OFDM signal, generates a real component (I channel) 21I of the OFDM signal and an imaginary component (Q channel) 21Q of the OFDM signal, and provides the OFDM signal 21I and 21Q to the A/D converter 30.

The A/D converter 30 converts the real component 21I and the imaginary component 21Q of the OFDM signal into a real component 31I and an imaginary component 31Q of a digital OFDM signal, and provides the digital OFDM signal 31I and 31Q to the FFT processor 40.

The FFT processor 40 is coupled to the A/D converter 30, receives the digital OFDM signal 31I and 31Q, and transforms symbols of the OFDM signal by fast Fourier transform (FFT) through the calculation of the complex numbers, which is represented by the following expressions.

First, in the FFT expressions, an input of FFT is represented by the following Expression 1 using real and imaginary components.

$$x(n)=a(n)+jb(n), \qquad \text{<Expression 1>}$$

(wherein, x(n) is an input of FFT, a(n) is a real component of x(n), and b(n) is an imaginary component of x(n)).

Expression 2 shows an output of FFT.

$X(k)=A(k)+jB(k).$ <Expression 2>

X(k) is applied to a general FFT expression as shown in expressions 3, 4 and 5.

$$X(k) = \sum_{n=0}^{N-1} x(n)\varepsilon^{-j2\frac{\pi}{N}kn}.$$ <Expression 3>

$$A(k) + jB(k) = \sum_{n=0}^{N-1} [a(n) + jb(n)]\left[\cos\left(-j2\frac{\pi}{N}kn\right) + j\sin\left(-j2\frac{\pi}{N}kn\right)\right]$$ <Expression 4>

$$= \sum_{n=0}^{N-1} [a(n)\cos\theta_{kn} + b(n)\sin\theta_{kn}] + j[-a(n)\sin\theta_{kn} + b(n)\cos\theta_{kn}],$$

wherein $\theta_{kn} = j2\frac{\pi}{N}kn.$

Therefore, $A(k) = \sum_{n=0}^{N-1}[a(n)\cos\theta_{kn} + b(n)\sin\theta_{kn}],$ <Expression 5> and $B(k) = \sum_{n=0}^{N-1}[-a(n)\sin\theta_{kn} + b(n)\cos\theta_{kn}],$ wherein $\theta_{kn} = j2\frac{\pi}{N}kn.$ The OFDM signal is divided into a real component and an imaginary component by the above FFT along the frequency axis of a digital modulated signal.

The FFT processor 40 transmits the transformed OFDM signal to the demodulator 50, where the OFDM signal has a real component 41I and an imaginary component 41Q, and then the demodulator 50 demodulates the OFDM signal having the real component 41I and the imaginary component 41Q. The demodulated OFDM signal 51 is transmitted to an external processing device, for example, to be replayed.

The above-mentioned FFT processor 40 will be described in detail with reference to the accompanying drawings.

Figure 3:
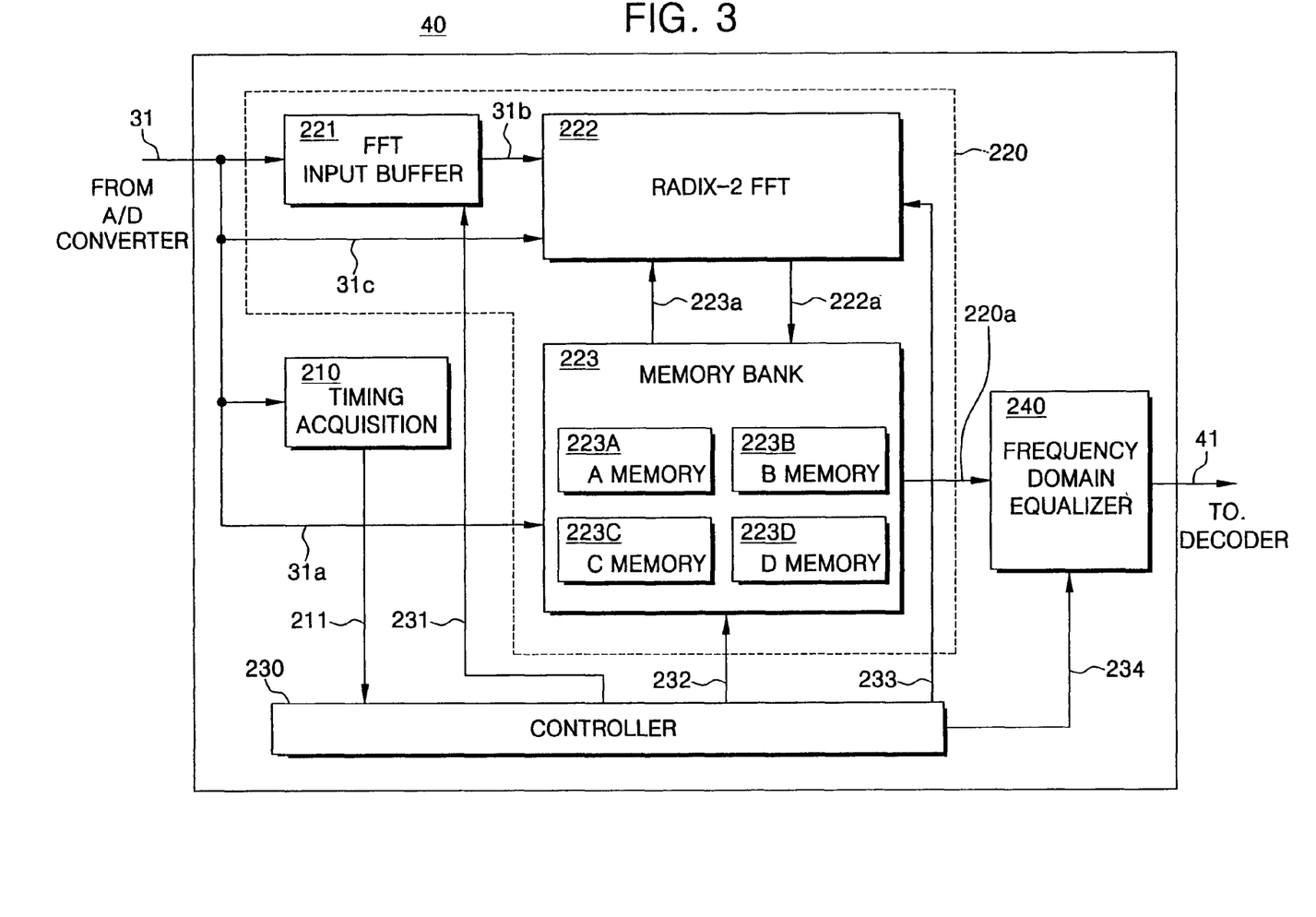
FIG. 3 is a block diagram illustrating an FFT processor according to embodiments of the present invention.
Figure 4:
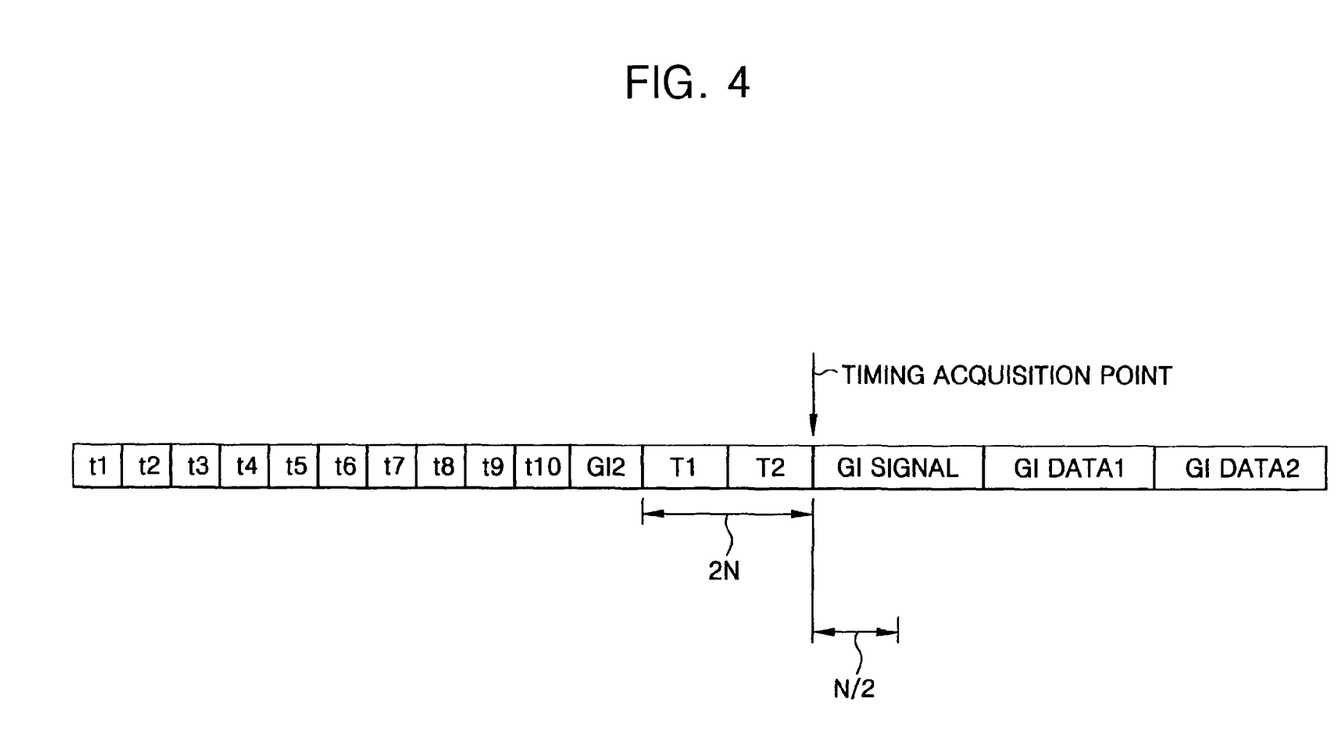
FIG. 4 is a view illustrating a packet of an OFDM signal so as to show data delay due to the FFT processor of FIG. 3.

FIG. 3 is a block diagram illustrating an FFT processor according to embodiments of the present invention, and FIG. 4 is a view illustrating the packet of an OFDM signal so as to show data delay due to the FFT processor of FIG. 3.

Referring to FIGS. 2 and 3, the FFT processor 40 includes a timing acquisition section 210, a signal converter 220, a controller 230 and a frequency domain equalizer 240. The FFT processor 40 transforms a digital OFDM signal in the time domain provided from an A/D converter 300 into the OFDM signal in the frequency domain, synchronizes the transformed OFDM signal with clock frequency of the FFT processor 40, and outputs the synchronized OFDM signal to a decoder (not shown). The decoder is coupled to an input terminal of the demodulator 50 for demodulating the synchronized OFDM signal.

Hereinafter, the real component of an OFDM signal and the imaginary component of an OFDM signal divided by the quadrature detector 20 will be referred to as an OFDM signal 31.

The timing acquisition section 210 detects an end point of long preambles T1 and T2 of the OFDM signal 31 and provides the detected timing signal 211 to the controller 230.

The signal converter 220 includes an FFT input buffer 221, a radix-2 FFT 222 having a linear systolic array architecture and a memory bank 223. The signal converter 220 converts the OFDM signal in the time domain into the OFDM signal 220a in the frequency domain in response to control signals 231, 232, and 233 provided from the controller 230, and then provides the OFDM signal 220a to the frequency domain equalizer 240.

More particularly, the FFT input buffer 221 has a single port, stores N/2 samples of the OFDM signal 31 that are input into the FFT input buffer 221, and provides the input OFDM signal 31 to the radix-2 FFT 222 when more than N/2 samples of the input OFDM signal 31 are stored in the FFT input buffer 221. The stored OFDM signal is a digital signal and corresponds to N/2 samples of data following the long preamble in the packet.

The radix-2 FFT 222 has a linear systolic array architecture, reads the long preamble from the memory bank 223, transforms the read long preamble into the long preamble of frequency domain in response to the control signal 233 provided from the controller 230, and then stores the transformed long preamble in the memory bank 223. In addition, the radix-2 FFT 222 transforms an OFDM signal 31b provided from the FFT input buffer 221 and an OFDM signal 31c input directly to the radix-2 FFT into the OFDM signals of frequency domain in response to the control signal 233, and then stores the transformed OFDM signals in the memory bank 223. As shown in FIG. 3, the long preamble of the OFDM signal, which is read by the radix-2 FFT from the memory bank 223, is represented by a reference numeral 223a. The long preamble or the data, which is transformed by the radix-2 FFT 222 and then is provided to the memory bank 223, is represented by a reference numeral 222a.

The linear systolic array architecture of FFT has a regular architecture, can be easily controlled, and is widely employed in application fields for high efficiency, because signals are serially input or output. A butterfly-processing element corresponds to each of the stages of an FFT 222.

The memory bank 223 includes first, second, third and fourth memories 223A, 223B, 223C, and 223D.

As shown in FIG. 4, the memory bank 223 allows an average of the long preambles to be completely input to the memory bank 223 during a N/2 clock cycle after timing acquisition occurs. The memory bank 223 functions as an output memory after an average of the long preambles is completely input to the radix-2 FFT. The first half data of the data input in series after the long preamble are stored in the FFT input buffer 221 and the latter half data of the input data are input into the radix-2 FFT 222 as soon as the latter half data are input. Input/output of the memory bank 223 will be described in detail in the accompanying drawings FIGS. 7 and 8.

In embodiments, each of the memories 223A, 223B, 223C, and 223D included in the memory bank 223 is a single port memory. Each of the memory functions as an input buffer of FFT until the long preambles are input into each of the memories, and functions as an output buffer of FFT after the long preambles are input into each of the memories. When the architecture of above memories is employed in the FFT processor or in the OFDM receiver having the FFT processor, hardware configuration may be simplified.

The controller 230 outputs the control signals 231, 232, and 233 in response to a timing signal 211 acquired from the timing acquisition section 210. The control signals 231, 232, and 233 control the operation of the FFT input buffer 221, the radix-2 FFT 222 having the linear systolic array architecture, and the memory bank 223. In addition, the controller 230 outputs a control signal 234 for controlling an output of the frequency domain equalizer 240.

As the control signal 234 provided from the controller 230 is input into the frequency domain equalizer 240, the frequency domain equalizer 240 synchronizes fast Fourier transformed values 220b with a clock frequency of the FFT processor using the arithmetic mean value of the long preambles T1 and T2. The frequency domain equalizer outputs the synchronized value 41 to the decoder (not shown). The value 220a is output from the memory bank 223.

The radix-2 FFT 222 reads the long preamble stored in the memory bank 223, transforms the long preamble by FFT, and stores the transformed long preamble in the memory bank 223. In addition, the radix-2 FFT 222 transforms data input through the FFT input buffer 221 and data input directly to the radix-2 FFT 222 by FFT, and then stores the transformed data in the memory bank 223. The memory bank 223 stores the long preamble that is not transformed by FFT and the transformed long preamble, respectively, and outputs the transformed long preamble or the transformed data to the frequency domain equalizer 240 for the purpose of demodulation according as the transformed data are input into the memory bank 223.

Figure 5:
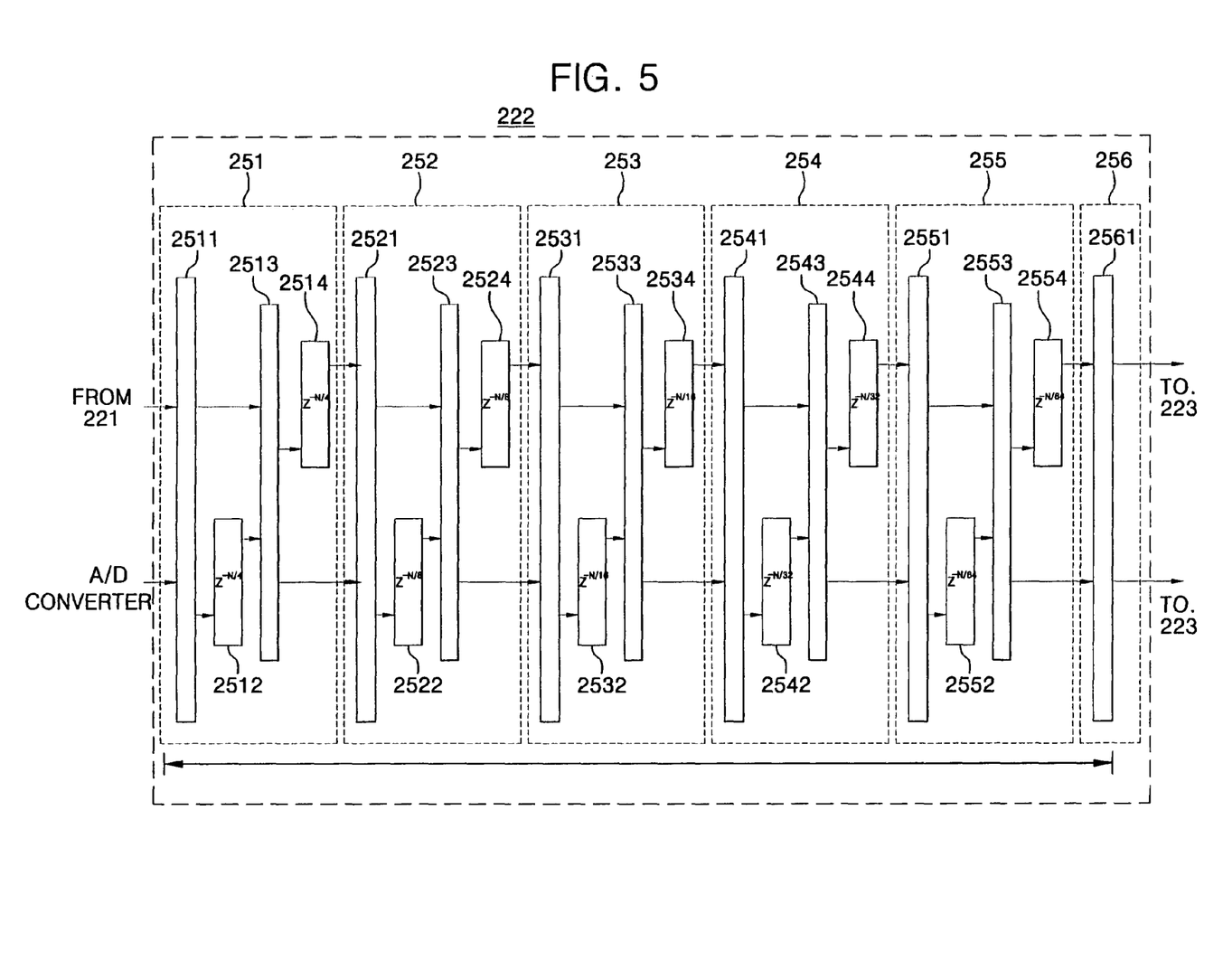
FIG. 5 is a block diagram illustrating embodiments of an FFT processor shown in FIG. 3 according to embodiments of the present invention.

FIG. 5 is a block diagram illustrating the FFT shown in the FIG. 3, and more particularly, shows a radix-2 FFT having the linear systolic array architecture. A radix-2 FFT having the linear systolic array architecture (or the pipelined radix-2 FFT) is disclosed, for example, in European Patent Application No. 0 478 128 A2, entitled Pipelined Fast Fourier Transform Processor, published Apr. 1, 1992. In European Patent Application No. 0 478 128 A2, the pipelined FFT processor includes a cascade-connected four butterfly processing devices. The butterfly-processing device is abbreviated as BAU.

Each of the butterfly-processing elements processes data received through an input terminal, and then each of the butterfly-processing elements sequentially applies the received data to an input terminal of a next stage or each of the butterfly-processing elements generates a pair of output signals when the butterfly-processing element corresponds to a last stage. The pair of output signals is applied to the memories through a multiplexer.

Referring to FIG. 5, a radix-2 FFT 222 having the linear systolic array architecture includes six butterfly stages 251, 252, 253, 254, 255 and 256.

Each of the butterfly stages includes radix-2 butterfly-processing elements 2511, 2521, 2531, 2541, and 2551, switching elements 2513, 2523, 2533, 2543, and 2553, first delay elements 2512, 2522, 2532, 2542, and 2552, and second delay elements 2514, 2524, 2534, 2544, and 2554. The radix-2 butterfly-processing elements 2511, 2521, 2531, 2541 and 2551 respectively include an upper input terminal, and a lower input terminal, an upper output terminal and a lower output terminal. The switching elements 2513, 2523, 2533, 2543 and 2553 include respectively an upper input terminal, a lower input terminal, an upper output terminal and a lower output terminal. The first delay elements 2512, 2522, 2532, 2542 and 2552 are connected between the low output terminal of the radix-2 butterfly processing element of the butterfly stage and the low input terminal of the switching element of the butterfly stage. The second delay elements 2514, 2524, 2534, 2544 and 2554 are connected between the upper output terminal of the switching element of the butterfly stage and the upper input terminal of the radix-2 butterfly-processing element of a next butterfly stage.

In this case, a last butterfly stage 256 has only one radix-2 butterfly-processing element 2561 respectively having an upper input terminal, a lower input terminal, an upper output terminal and a lower output terminal.

In other words, as shown in FIG. 5, the radix-2 FFT according to embodiments of the present invention has $\log_2^N$ numbers of butterfly stages and $\log_2^N - 2$ numbers of quadrature multipliers.

The data processed by the radix-2 FFT 222, for example the data processed by the radix-2 butterfly processing element 2561 of the last stage, is stored in the first and second memories 223A, 223B and the third and fourth memories 223C, 223D of the memory bank 223 alternatively. Moreover, the frequency domain equalizer 240 outputs the data that the radix-2 FFT 222 processes when the radix-2 FFT 222 stores the processed data in the memories. In other words, the memory bank 223 outputs the data stored in the third and fourth memory 223C, 223D to the frequency domain equalizer 240 when the data transformed by FFT are stored in the first and second memories 223A and 223B. The memory bank 223 outputs the data stored in the first and second memories 223A and 223B to the frequency domain equalizer 240 when the data transformed by FFT are stored in the third and fourth memories 223C and 223D.

The FFT, according to FIG. 5, uses ¼ clock rate, and uses N/2 samples that correspond to total FFT processing delay and can be the same as that of the conventional FFT.

For example, in a 64 point FFT, the radix-2 FFT, according to embodiments of the present invention, allows four quadrature multipliers, four N/2 single port memories and an N/2 tapped delay line (hereinafter, referred to as TDL) to operate at the sample rate, which can thereby reduce operating power.

Figure 6:
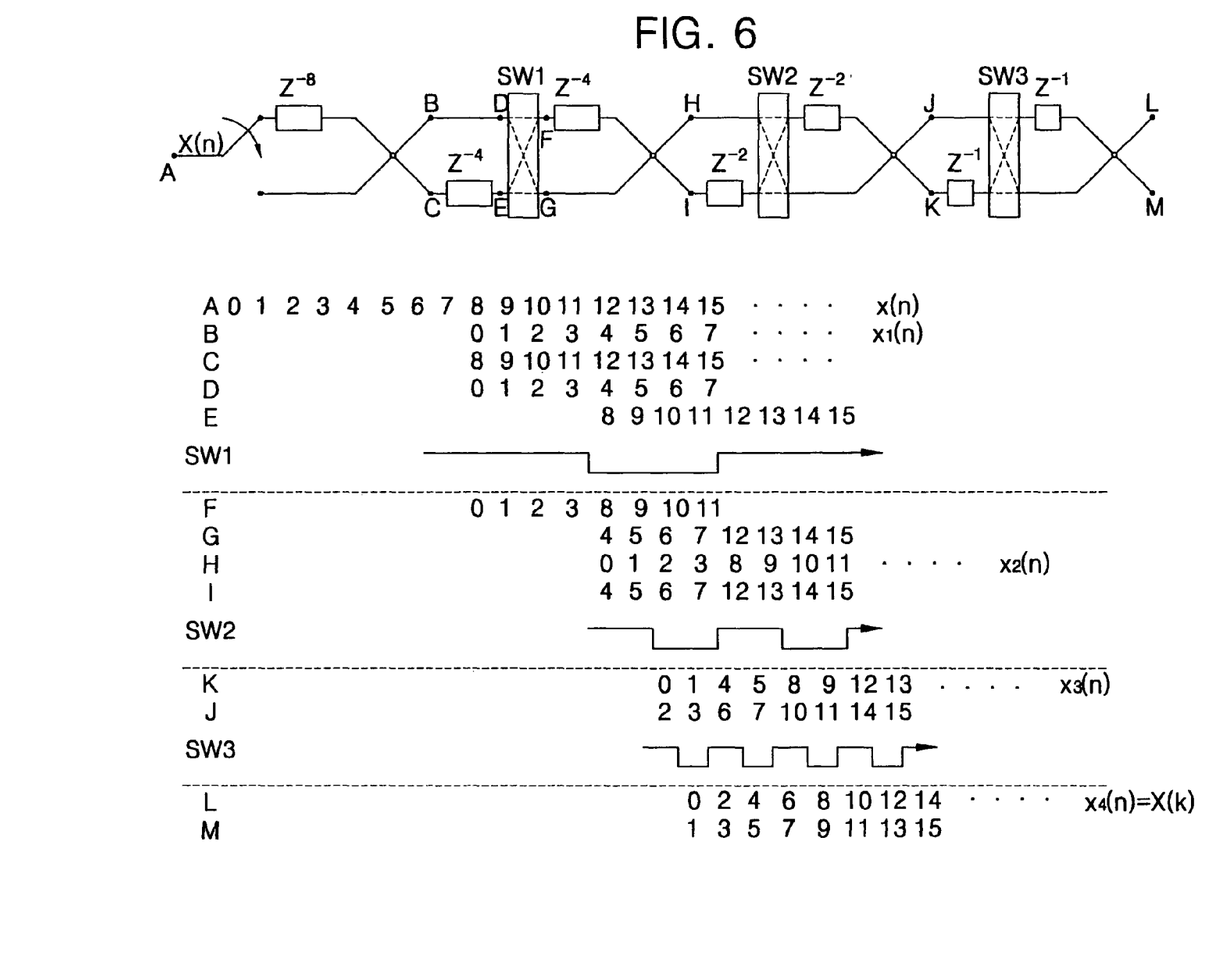
FIG. 6 is a schematic view illustrating operation of an FFT having a linear systolic array architecture shown in FIG. 5.

FIG. 6 is a schematic view illustrating operation of the FFT having a linear systolic array architecture shown in FIG. 5. FIG. 5 shows the radix-2 FFT having 64-point linear systolic array architecture. However, FIG. 6 shows the radix-2 FFT having 16-point linear systolic array architecture, and shows data flow according to the radix-2 FFT having the 16-point linear systolic array architecture.

The data input into the each of switches SW1, SW2, and SW3 is crossed by each of switches SW1, SW2, and SW3 to be output from each of switches SW1, SW2, and SW3, then is input into a corresponding butterfly element, and the butterfly element of the last stage outputs the transformed OFDM signal that is a frequency domain representation of the OFDM signal.

As described above, an FFT processor according to embodiments of the present invention may allow reduced capacity of the memory. More particularly, in embodiments, each of the memories of the memory bank 223 is a single port memory, functions as the FFT input buffer when the long preamble is input into the memory bank 223, and functions as the FFT output buffer after the long preamble is input into the memory bank 223, so that an FFT processor according to embodiments of the present invention may simplify and decrease the amount of hardware.

Moreover, according to embodiments of the present invention, every signal following the long preamble need not be delayed until every signal following the long preamble is input into the input terminal of the radix-2 FFT 222, so that data-processing delay time may be shortened although the radix-2 FFT 222 operates with ½ clock-rate. More particularly, the data that is under the process of timing acquisition is stored in sequence in the first, second, third and fourth memories 223A, 223B, 223C and 223D. T1 is stored at a next address of a present memory that stores the data when timing acquisition is determined.

Figure 7:
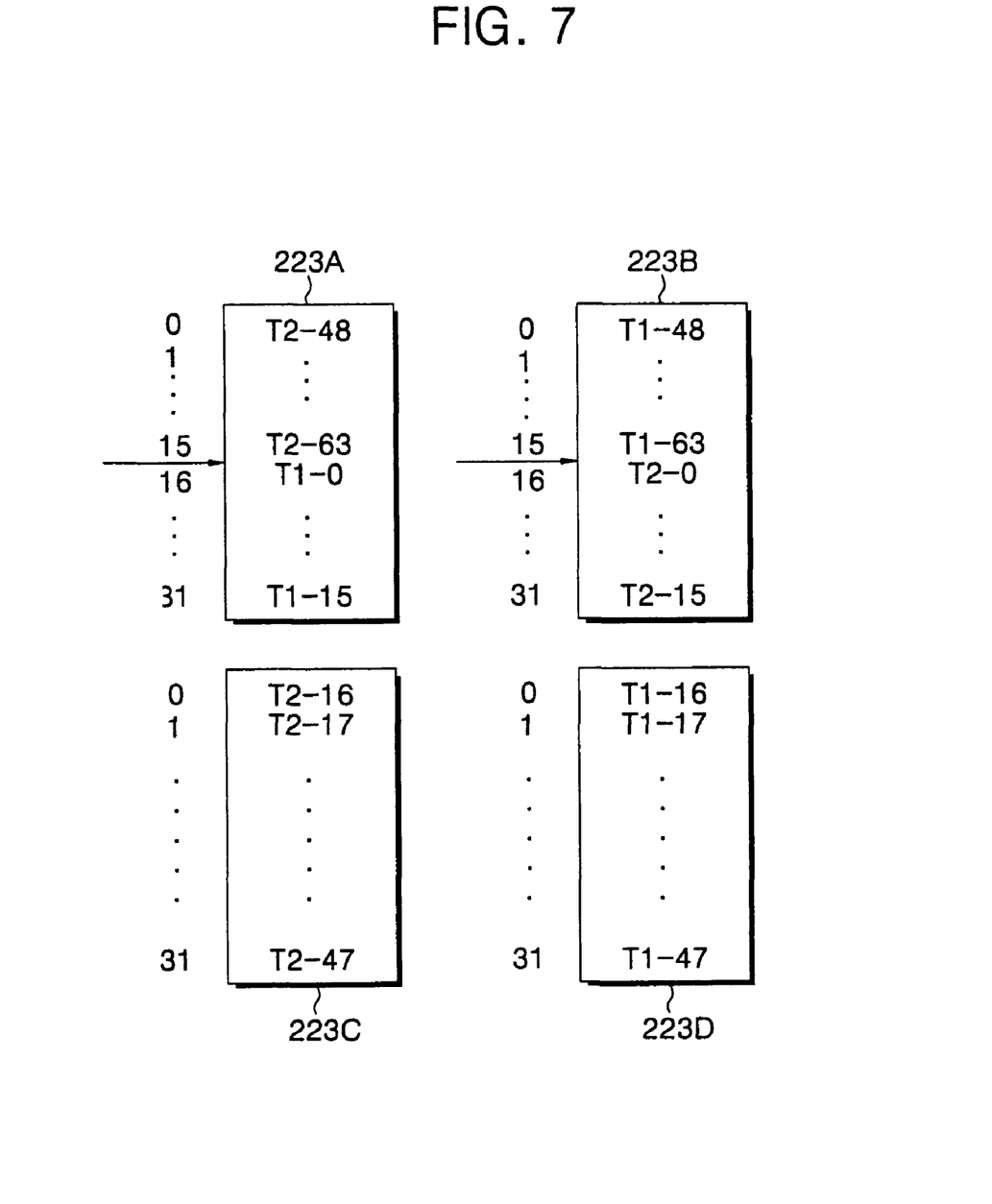
FIG. 7 is a schematic view illustrating a memory bank into which data is input according to embodiments of the present invention.

In the 64-point FFT, when the timing acquisition point corresponds to address 15 of the first memory 223A, distribution of the data stored in the memories may have the same data distribution as shown in FIG. 7.

Figure 8:
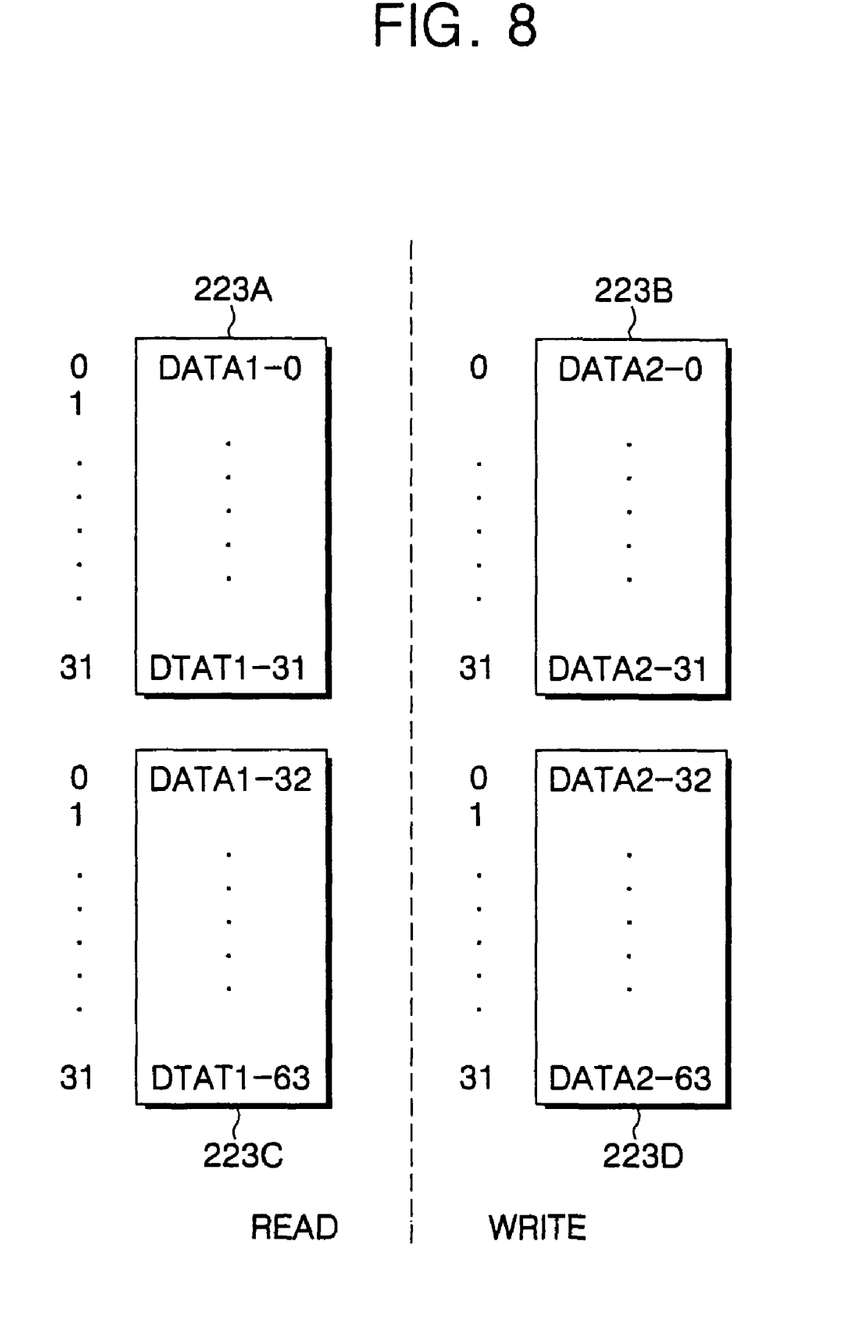
FIG. 8 is a schematic view illustrating a memory bank from which data is output according to embodiments of the present invention.

FIG. 7 is a schematic view illustrating a memory bank into which data is input, according to embodiments of the present invention, and FIG. 8 is a schematic view illustrating a memory bank from which data is output, according to embodiments of the present invention.

Referring to FIGS. 7 and 8, the memory bank 223 allows an average of the long preambles T1 and T2 to be completely input to the radix-2 FFT during an N/2 clock cycle after timing acquisition occurs. The memory bank 223 functions as an output memory after the average of the long preambles is completely input to the radix-2 FFT. The first half data of the data is stored in the FFT input buffer 221 after the symbol is input to the into the radix-2 FFT 222, and the latter half data of the input data is input into the radix-2 FFT 222 as soon as the latter half data is input. Accordingly, the delay due to input buffer may be reduced or eliminated according to embodiments of the present invention.

As a result, an input signal of the long preamble may be input to the radix-2 FFT 222 during a N/2 clock cycle in the following procedure.

(B16+D16)/2, (C16+A16)/2
(B17+D17)/2, (C17+A17)/2
. . .
(C0+A0)/2, (B0+D0)/2
. . .
(C15+A15)/2, (B15+D15)/2

As shown in FIG. 7, the memory bank 223 allows an average of the long preambles T1 and T2 to be completely input to the radix-2 FFT during an N/2 clock cycle after timing acquisition occurs. The memory bank 223 functions as an output memory after the average of the long preambles is completely input to the radix-2 FFT. The first half data of the data is stored in the FFT input buffer 221 after the symbol is input to the into the radix-2 FFT 222, and the latter half data of the input data is input into the radix-2 FFT 222 as soon as the latter half data is input. Accordingly, the delay due to input buffer may be reduced or eliminated according to embodiments of the present invention.

As described above, an OFDM receiver according to embodiments of the present invention can include the linear systolic array architecture for the purpose of low power consumption, and the memory bank can use a parallel buffer in order to reduce or eliminate processing delay due to the output through memory bank. As a result, signal delay may be shortened, and hardware may be used efficiently because the parallel buffer is reused as an output buffer of the radix-2 FFT 222.

Figure 9A:
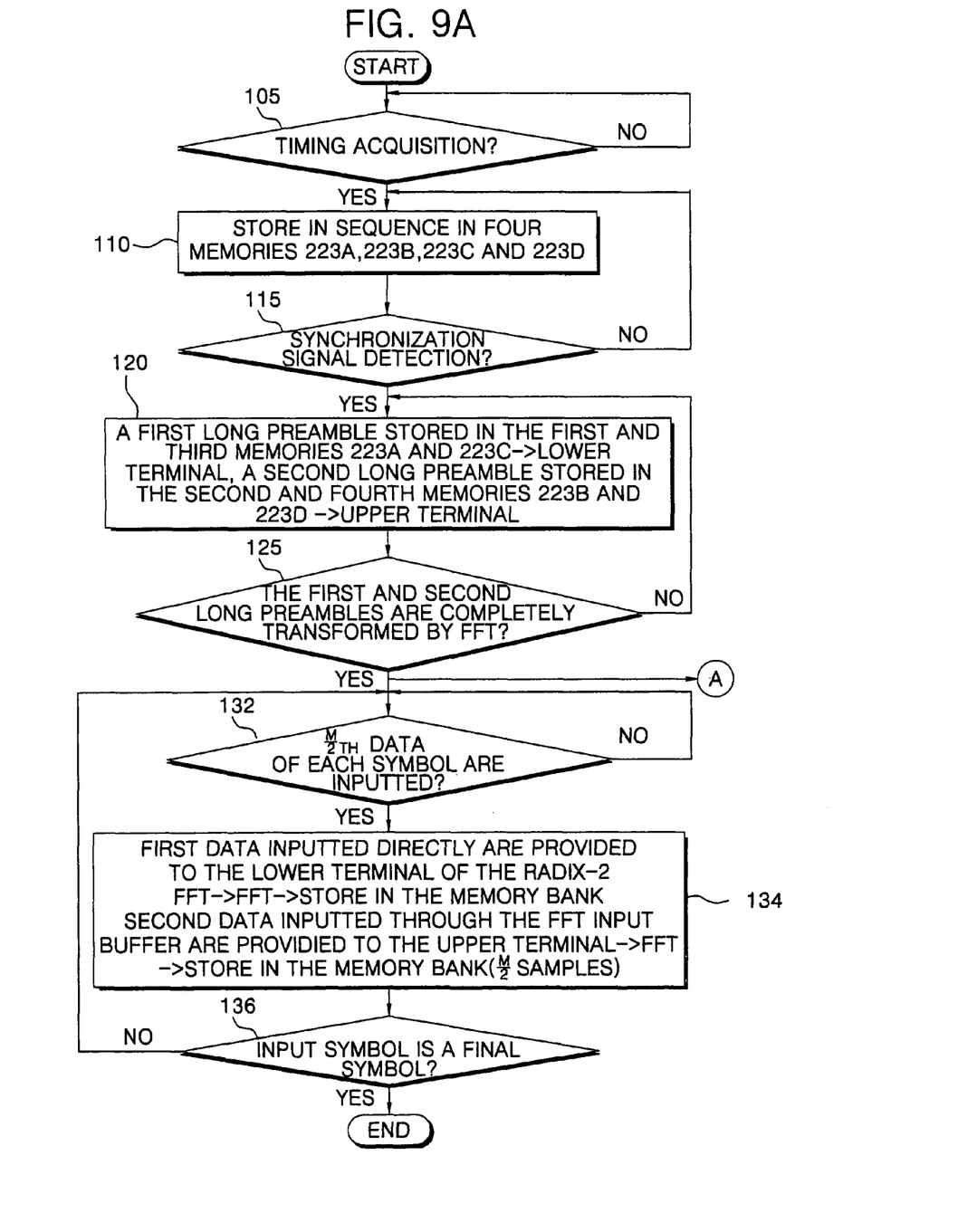
FIGS. 9A and 9B are a flowchart illustrating demodulation by OFDM receiver according to embodiments of the present invention.
Figure 9B:
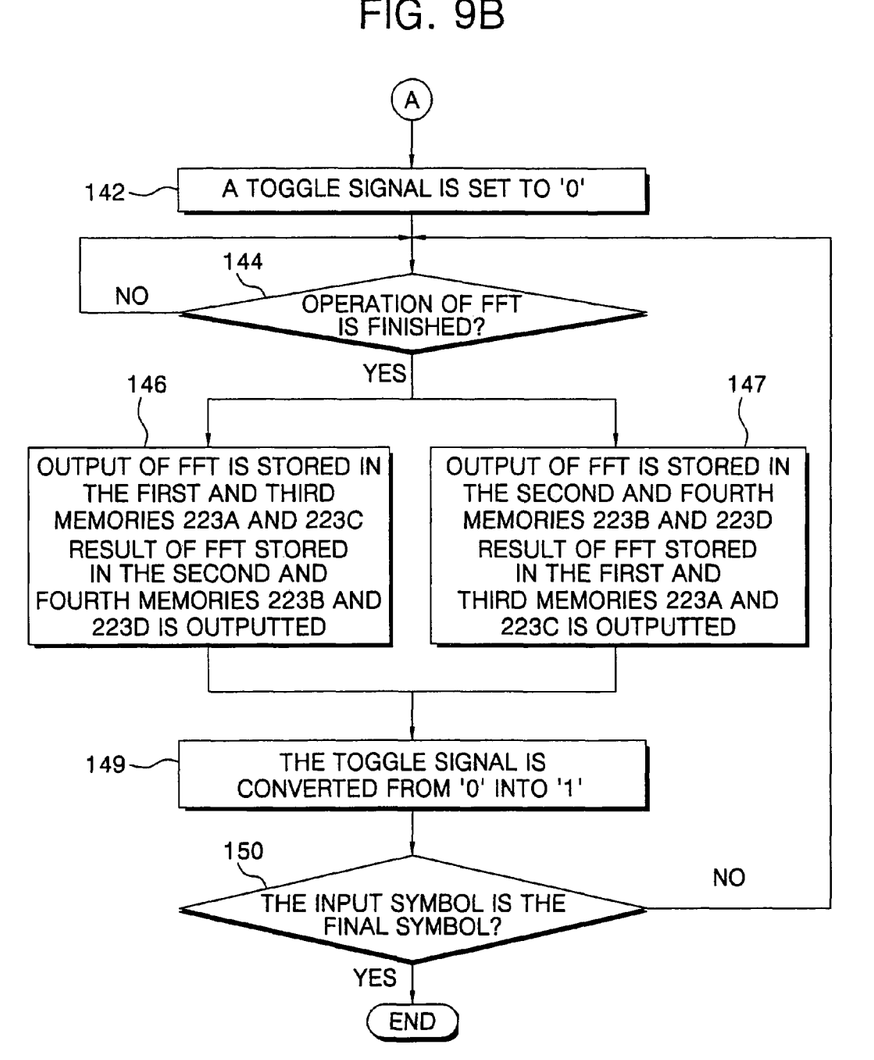

FIGS. 9A and 9B are a flow chart illustrating demodulation by an OFDM receiver according to embodiments of the present invention.

Referring to FIGS. 6, 9A and 9B, first, the controller 230 checks whether or not timing acquisition occurs (Block 105). When timing acquisition occurs, the digital long preambles directly input from the A/D converter 30 are stored in sequence in four memories 223A, 223B, 223C and 223D (Block 110).

Subsequently, the timing acquisition section 210 detects a synchronization signal (Block 115). When the synchronization signal is not detected, the operations of Block 110 are performed again. When the synchronization signal is detected, a first long preamble stored in the first and third memories 223A and 223C is input into a first input terminal (hereinafter, referred to as a lower input terminal) of the radix-2 FFT 222, a second long preamble stored in the second and fourth memories 223B and 223D is input into a second input terminal (hereinafter, referred to as a upper terminal) of the radix-2 FFT 222, and then the first and second long preambles are transformed by FFT (Block 120). The first long preamble may be input into the upper terminal of the radix-2 FFT, the second long preamble may be input into the lower terminal of the radix-2 FFT, and then the first and second long preambles may be transformed by FFT.

Subsequently, the radix-2 FFT 222 checks whether the first and second long preambles are completely transformed by FFT (Block 125). When the first and second long preambles are not transformed by FFT, the operations of the Block 120 are performed again or are continued to be performed.

When the first and second long preambles are transformed by FFT, the radix-2 FFT 222 checks whether M/2-th data of each symbol is input or not (Block 132). When the M/2-th data of each symbol is not input, the operations of Block 132 are performed again. When the M/2-th data of each symbol is input, first data input is directly provided to the lower terminal of the radix-2 FFT 222, then the first data input is directly transformed by FFT, and the transformed first data is stored in the memory bank 223. Also, second data input through the FFT input buffer 221 is provided to the upper terminal of the radix-2 FFT, the second data is transformed by FFT, and the transformed second data is stored in the memory bank 223 (Block 134). For example, when the FFT processor 40 performs FFT on the 64-point OFDM signal and 33-th data are input, first data stored in the FFT input buffer 221 and the 33-th data are input into the radix-2 FFT 222 for the purpose of fast Fourier transform.

Also, second data and 34-th data are input into the radix-2 FFT 222 for the purpose of fast Fourier transform. Subsequently, the radix-2 FFT 222 checks whether or not the input symbol is a final symbol at Block 136. When the input symbol is the final symbol, the demodulation process of the data is finished. However, when the input symbol is not the final symbol, operations of Block 132 are performed again. In this case, a message indicating that the input symbol is the final symbol is provided to the radix-2 FFT 222 through the decoder/demodulator, etc.

In Block 125, when the first and second long preambles are transformed by FFT, a toggle signal is set to '0' (Block 142), and the radix-2 FFT 222 determines whether or not the operation of FFT is finished (Block 144).

In Block 144, when the operation of FFT is not finished, additional operations are not performed until the operation of FFT is finished. However, when the operation of FFT is finished, an output of FFT is stored in the first and third memories 223A and 223C, and the result of FFT, which is transformed by FFT and is stored in the second and fourth memories 223B and 223D, is output (Block 146). Particularly, M/2 samples are stored in the first and third memories 223A and 223C, and M samples are output from the second and fourth memory 223B and 223D.

Additionally, in Block 144, when the operation of FFT is finished, the result of FFT is stored in the second and fourth memories 223B and 223D, and the result of FFT stored in the first and third 223A and 223C is output (Block 147). Particularly, M/2 samples are stored in the second and fourth memories 223B and 223D, and M samples are output from the first and third memories 223A and 223C.

Subsequently, the toggle signal is converted from '0' into '1' (Block 149), and the radix-2 FFT 222 determines whether or not the input symbol is the final symbol (Block 150). When the input symbol is the final symbol, the demodulation process of the data is finished. However, when the input symbol is not the final symbol, the operations of Block 144 are performed again.

When N-point FFT is performed, generally $\log_2^N$ numbers of stages are used. When the radix-2 FFT and single stage are used, $N/2 * \log_2^N$ processing time is generally used. For example, when N is 64, 192(=32*6) processing time is used, and FFT is performed at four times faster than the sample clock in order to process other symbols that are input. In other words, processing time is ¼*32*6=48, and processing delay (including input/output delay of memory) corresponding to about N samples is used.

However, FFT processors according to embodiments of the present invention may reduce the total FFT processing delay to N/2 samples even though ¼ clock rate are used.

Although the above exemplary embodiments discuss an FFT processor that includes four quadrature multipliers, four single port memories that store N/2 samples and the FFT processor operating N/2 TDL (Tapped Delay Line) with sample rate, the FFT processor could also be applied to various other point FFTs, for example 8-point FFT, 16-point FFT and etc., so that power consumption may be reduced during operation of the FFT processor.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A Fast Fourier Transform (FFT) processor for demodulating an orthogonal frequency division multiplexing (OFDM) signal including a preamble having a sequence of N samples and first data following the preamble and having a sequence of N/2 samples, the FFT processor comprising:
    a timing acquisition section that is configured to output a timing signal in response to detecting an end point of the preamble;
    a controller that is configured to output a first control signal and a second control signal in response to the timing signal;
    a signal converter that is configured to store the preamble in response to the first control signal, to transform the preamble by an N-point FFT into a second preamble, and to store the second preamble;
    an FFT input buffer that is configured to store the N/2 samples of the first data while the preamble is being transformed, wherein the signal converter is further configured to perform an N-point FFT on the buffered first data and second data having a sequence of N/2 samples as the second data is sequentially received, to transform the first data and the second data into third data having N samples; and
    a frequency domain equalizer that is configured to synchronize the second preamble and the third data in response to the second control signal with a clock frequency of the fast Fourier transform processor, and to output the synchronized second preamble and the third data.

2. The FFT processor of claim 1, further comprising an analog to digital converter (ADC), wherein the FFT buffer is coupled to the ADC and receives the first data from the ADC and wherein the signal converter is coupled to the ADC and receives the first data as buffered data from the FFT input buffer and receives the second data as unbuffered data from the ADC.

3. The FFT processor of claim 2, wherein the FFT input buffer is configured to delay the first data by N/2 samples.

4. The FFT processor of claim 2, wherein the signal converter comprises an FFT processing element including a first input line configured to receive a sample of the first data and a second input line configured to receive a sample of the second data.

5. The FFT processor of claim 2, further comprising:
    a quadrature detector that is configured to receive the OFDM signal, to convert the OFDM signal into a baseband OFDM signal, to generate a real component of the OFDM signal and an imaginary component of the OFDM signal, and to output the real component of the OFDM signal and the imaginary component of the OFDM signal to the ADC.

* * * * *